(12) United States Patent
Shiroyama

(10) Patent No.: US 7,751,209 B2
(45) Date of Patent: Jul. 6, 2010

(54) SWITCHING POWER SUPPLY EQUIPMENT

(75) Inventor: Hironobu Shiroyama, Hino (JP)

(73) Assignee: Fuji Electric Device Technology Co., Ltd. (JP)

( * ) Notice: Subject to any disclaimer, the term of this patent is extended or adjusted under 35 U.S.C. 154(b) by 88 days.

(21) Appl. No.: 11/771,037

(22) Filed: Jun. 29, 2007

(65) Prior Publication Data
US 2008/0001589 A1 Jan. 3, 2008

(30) Foreign Application Priority Data
Jun. 29, 2006 (JP) .............................. 2006-179238

(51) Int. Cl.
*H02M 3/335* (2006.01)
(52) U.S. Cl. ..................................... 363/21.12; 363/20
(58) Field of Classification Search ................. 323/282, 323/271, 234; 363/21.12, 21.15, 20, 56.07, 363/56.08
See application file for complete search history.

(56) References Cited

U.S. PATENT DOCUMENTS

| | | | | |
|---|---|---|---|---|
| 4,330,816 A | * | 5/1982 | Imazeki et al. | ........... 363/21.05 |
| 5,617,013 A | * | 4/1997 | Cozzi | .......................... 323/222 |
| 2006/0013020 A1 | * | 1/2006 | Aso | ........................ 363/21.01 |
| 2006/0018136 A1 | * | 1/2006 | Takahashi | ................. 363/21.15 |
| 2006/0113978 A1 | * | 6/2006 | Suzuki | ........................ 323/282 |

FOREIGN PATENT DOCUMENTS

JP 2004-040858 A 2/2004

\* cited by examiner

*Primary Examiner*—Bao Q Vu
*Assistant Examiner*—Nguyen Tran
(74) *Attorney, Agent, or Firm*—Rossi, Kimms & McDowell LLP

(57) ABSTRACT

A switching power supply equipment has a function to protect a power supply from abnormalities such as an output short-circuit. An output signal from an error amplification circuit to amplify a difference voltage between an output voltage and a predetermined voltage is input into a feedback terminal of an integrated circuit power supply control circuit, and a power transistor is controlled by a pulse-width control circuit base on the output signal. n addition, a comparator having a reference voltage and a series circuit of a capacitor and a resistor making operation of an overload protection circuit delay are connected to a connecting point of the error amplification circuit and the pulse-width control circuit. The overload protection circuit starts operation by an output of the comparator. The number of required terminals of the integrated circuit is decreased and also a package size of the integrated circuit is decreased in comparison to convention switching power supply equipment incorporating similar protection circuitry.

6 Claims, 8 Drawing Sheets

SWITCHING POWER SUPPLY EQUIPMENT

CROSS-REFERENCE TO RELATED APPLICATION

This application claims priority from Japanese Patent Application PA 2006-179238, filed Jun. 29, 2006, the contents of which are incorporated herein by reference.

BACKGROUND

The present invention relates to a switching power supply such as a DC-DC converter, and more specifically to switching power supply equipment including a protection function to protect a power supply from an over load.

In a switching power supply equipment such as a DC-DC converter, a protection function is provided to prevent heat generation or destruction in the case of an over load such as a connected load short-circuit. One measure that can be taken, for example, is to stop the operation of the power supply when the over load occurs. When such a protection circuit is used, in a case in which the protection function is attempted to be operated in at the moment the over load is caused, the protection function might malfunction though the switching power supply equipment operates normally since it is impossible to discriminate whether the over current flows transiently in starting or the over current flows transiently during a sudden change in the load condition.

To avoid such a malfunction, it is disclosed in, for example, Japanese Patent Laid-Open No. 2004-40858 that a delay time is provided so that the protection function works after the over load is caused, and that the over load state is discriminated as an abnormality when the over load state continues for a constant time and then the protection function starts operation. Further, Japanese Patent Laid-Open No. 2004-40858 discloses a method by which a delay time is provided by using a charge time of a capacitor and a method by which a delay time is provided by combining a reference clock and a counter.

FIG. 8, for example, is a schematic diagram showing a circuit configuration of conventional switching power supply equipment including such a protection function. The switching power supply equipment includes a power transistor PT1 connected in series with a primary winding of an output transformer T1, and an input DC voltage Vin is switched ON and OFF by the power transistor PT1 and a pulsating flow generated to a secondary winding of an output transformer T1 is rectified and smoothed by a diode D1 and a capacitor C1 to output a rectified and smoothed voltage. The switching power supply equipment further includes a power supply control circuit 100, being an integrated circuit, and an error amplifier which amplifies a difference voltage between an output voltage (a voltage across the capacitor C1) and a predetermined voltage (when resistance values of resistors R201 and R202 are respectively assumed R201 and R202, Vr×(R201+R202)/R202 becomes the predetermined voltage) based on inputting a divided voltage which the output voltage is divided by resistors R201 and R202 and the output voltage Vr of a reference voltage source Vr1.

In addition, the power supply control circuit 100 includes an internal power supply 101 which an internal power supply voltage regulated from a source voltage Vcc is generated and supplies the internal power supply voltage to internal circuits of the power supply control circuit 1, a pulse-width control circuit 102 which controls a drive pulse width of the power transistor PT1 based on an output of an error amplification circuit 200, and an overload protection circuit 13 which functions in the over load. The power supply control circuit 100 further includes comparators IC101 and IC102, a resistor R101, a current source Is101 and an electric switch SW101, and the power supply control circuit 100 is an integrated circuit including these circuits and components. The comparator IC102 compares an output of the error amplification circuit 200 with a reference voltage Vref2, and the electric switch SW101 is opened or closed by the output of the comparator IC102. A capacitor C10 being a delay (an integral) element is connected to the power supply control circuit 100, and a comparator IC101 compares an integral voltage of the capacitor C10 integrating an electric current from the current source Is101 with a reference voltage Vref1.

The error amplification circuit 200 includes resistors R201 and R202 dividing the output voltage, and an amplifier IC 201 which amplified a difference voltage between a divided voltage of the output voltage and a reference voltage Vr1, and an output voltage of the amplifier IC 201 is input to the power supply control circuit 100 through a photocoupler 201 as a feedback voltage FB.

In the switching power supply equipment of the above configuration, when an over load is caused and the output voltage falls to less than the predetermined voltage in the switching power supply equipment, the output of the amplifier IC 201 rises, and a signal being in response to the output of the amplifier IC201 through the photocoupler 201 is transmitted to a feedback terminal of the power supply control circuit 100, so that the feedback voltage FB of the feedback terminal rises. When the feedback voltage FB becomes more than the reference voltage Vref2, the electric switch SW101 is closed due to an output of comparator IC102 being inverted, and the capacitor C10 is charged (integrated) by the current source Is101 due to the current source Is101 being connected to the capacitor C10, so that the voltage of the capacitor C10 rises slowly. And when the voltage of the capacitor C10 becomes more than the reference voltage Vref1, the output of the comparator IC101 is inverted and the overload protection circuit 103 starts operation, so that the power transistor PT1 becomes OFF, and the power supply stops.

However, in the conventional switching power supply equipment described above, a delay time till the overload protection circuit starts operation after the over load is caused is different for every used circuit. Thus, when the control circuit having such a protection function is integrated and used, it is necessary to provide a special terminal, for example, to connect externally a capacitor (which corresponds to C10 of FIG. 8) for charging (integrating) so that an arbitrary delay time can be set. Accordingly, there are problems that the number of the terminals of the integrated circuit increases and a package size increases.

SUMMARY OF THE INVENTION

The present invention addresses the problems discussed above, and aims to provide a switching power supply equipment in which the number of terminals of an integrated circuit is not increased and also a package size of the integrated circuit is not increased to set an operating delay time of a protection function.

According to a first aspect of the invention, a switching power supply equipment which a pulsating flow generated by a direct current being switched ON and OFF by a switching element is smoothed, or rectified and smoothed, and outputs an output of the switching power supply equipment, including an error amplification circuit amplifying a difference voltage between an output voltage of the switching power supply equipment and a predetermined voltage, the error amplification circuit outputting an amplified output, a switching control circuit which controls ON and OFF of the switching element by the output of the error amplification circuit, a comparator which compares a reference voltage with a voltage of an input terminal of the switching control circuit which the output of the error amplification circuit is input, a protection circuit which operation is started based on output of the comparator, the protection circuit which functions at the time of abnormality of the output voltage of the switching power supply equipment, and a delay circuit for delaying operation of the protection circuit, the delay circuit connected to the input terminal.

In such equipment, because the delay circuit to delay operation of the protection circuit is connected to the input terminal of the switching control circuit which the output of the error amplification circuit is input, the number of terminals of an integrated circuit is not increased and a package size of the integrated circuit is not increased to set the operating delay time of the protection function.

Because a delay circuit to make operation of the protection circuit delay is connected to an input terminal of the switching control circuit which an output of an error amplification circuit is input, the switching power supply equipment according to the present invention has advantages in that the number of terminals of an integrated circuit is not increased and also a package size of the integrated circuit is not increased to set the operating delay time of the protection function.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
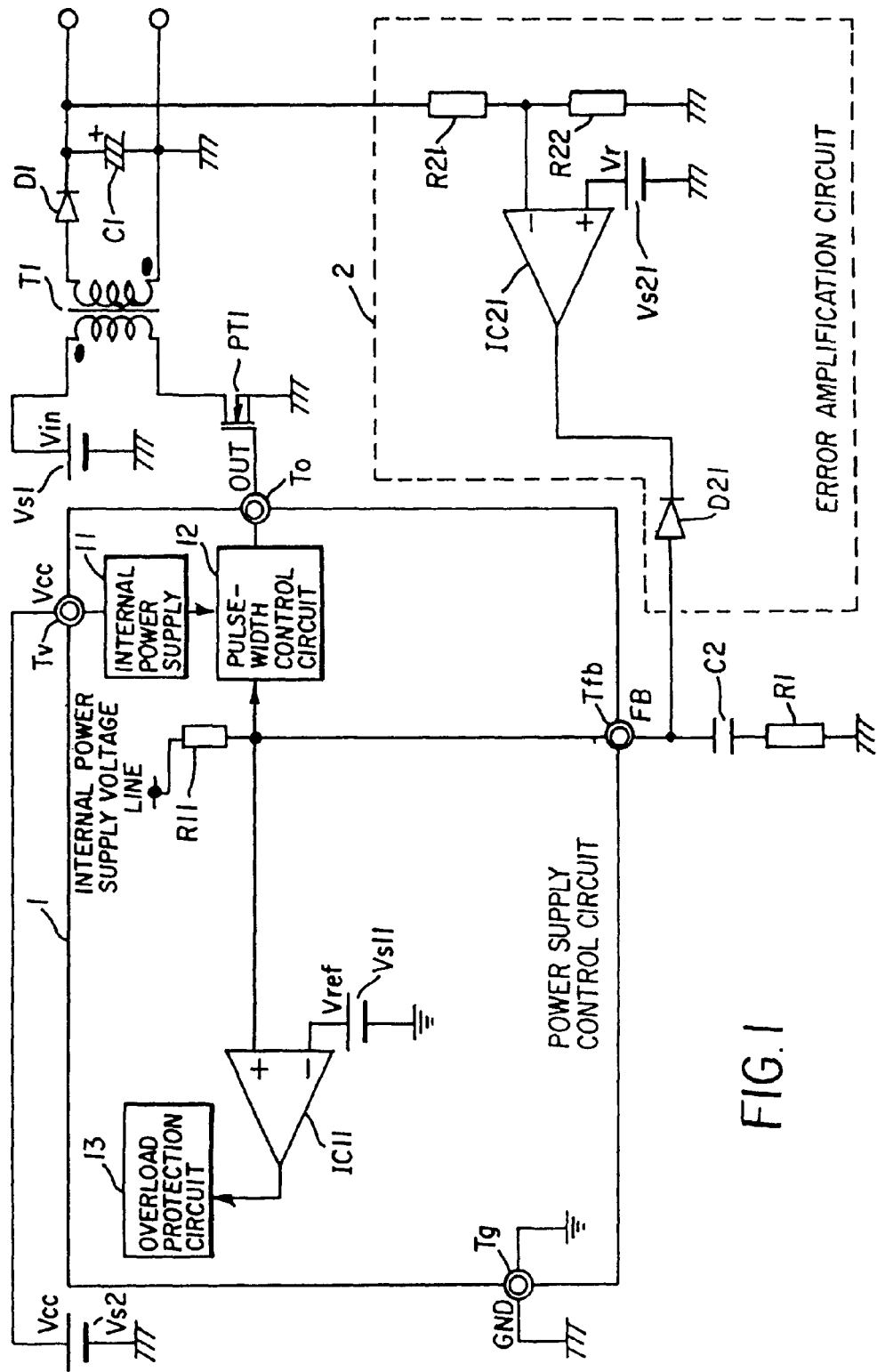
FIG. 1 is a schematic diagram showing a circuit configuration of a switching power supply equipment according to a first embodiment of the present invention.

Preferred embodiments according to the present invention will now be explained with reference to the attached drawings. FIG. 1 is a schematic diagram showing a circuit configuration of a switching power supply equipment according to a first embodiment of the present invention. The switching power supply equipment is configured as a DC-DC converter of a flyback type, and includes a power transistor PT1 of an N channel being a switching element connected in series with a primary winding of an output transformer T1. An input voltage Vin from a DC power source Vs1 is switched ON and OFF by the power transistor PT1. A pulsating flow generated hereby to a secondary winding of an output transformer T1 is rectified and smoothed by a diode D1 and a capacitor C1, and becomes an output voltage. The output voltage is output to a load (not illustrated).

A power supply control circuit 1 for controlling a drive of the power transistor PT1 is assembled in a package as an integrated circuit, and includes an input terminal Tv which a source voltage Vcc from a DC power source Vs2 is input, an output terminal to outputting a gate drive pulse OUT of the power transistor PT1, an input feedback terminal Tfb (or, merely, an input terminal Tfb) which a feedback voltage FB from an error amplification circuit 2 is input and a ground (GND) terminal Tg connected to a ground (GND) potential.

Figure 8:
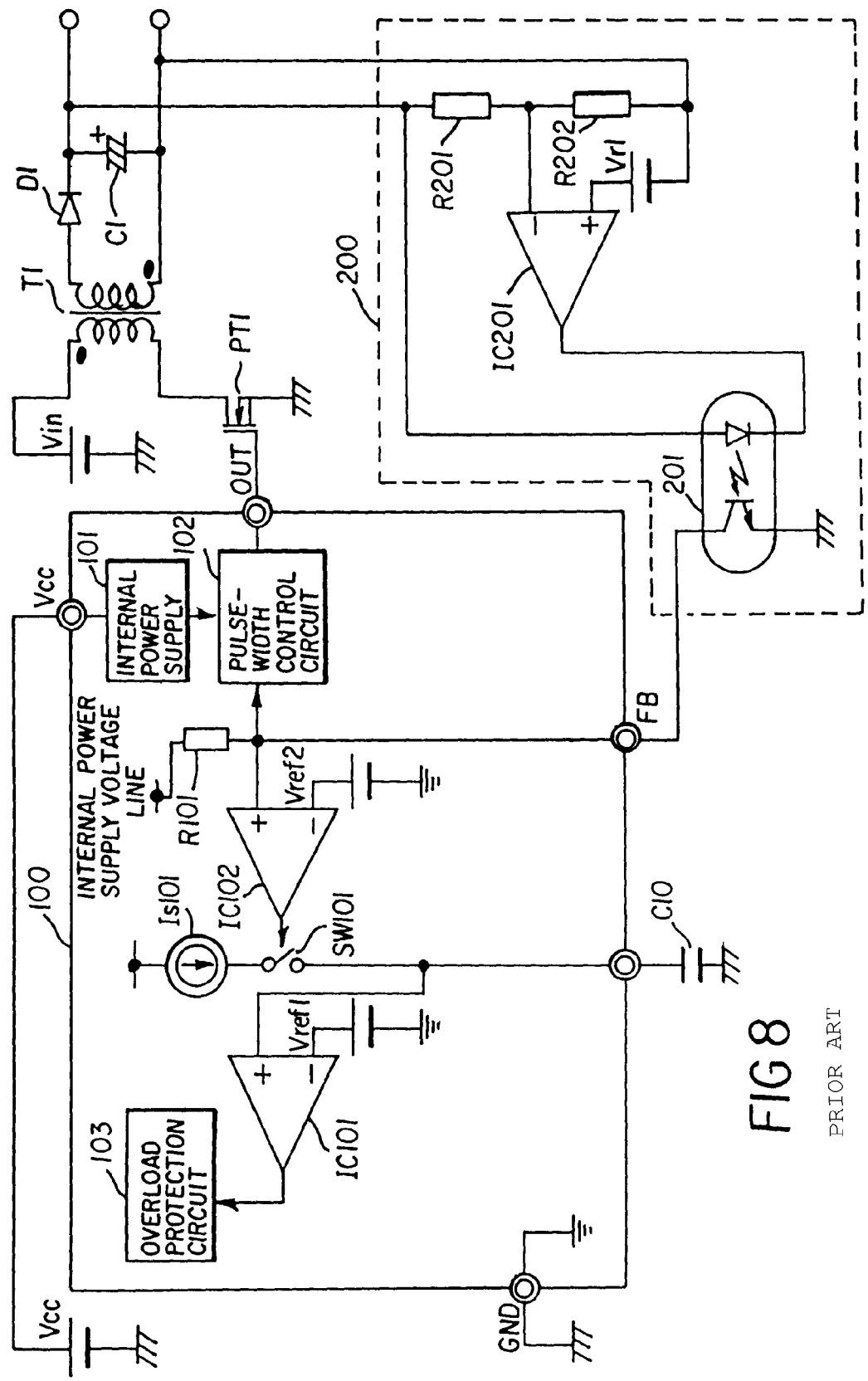
FIG. 8 is a schematic diagram showing a circuit configuration of a conventional switching power supply equipment.

In addition, the power supply control circuit 1 includes an internal power supply 11 which an internal power supply voltage regulated from source voltage Vcc is generated and supplies the internal power supply voltage to internal circuits of the power supply control circuit 1, a pulse-width control circuit 12 being a switching control circuit for controlling ON and OFF of the power transistor PT1 based on an output of the error amplification circuit 2, a comparator IC 11 which compares a reference voltage Vref of a voltage source Vs11 with a voltage of the feedback terminal Tfb which the feedback voltage FB being output from the error amplification circuit 2 is input, and an overload protection circuit 13 which operation is started based on an output of the comparator IC 11 and functions in abnormality of an output voltage (a voltage across the capacitor C1). A charging resistor R11 supplied the internal power supply voltage from the internal power supply 11 is connected to a connection point of the pulse-width control circuit 12 and a non-inverting input terminal of the comparator IC 11. The error amplification circuit 2 for amplifying and outputting a difference voltage between the output voltage (the voltage across the capacitor C1) and a predetermined voltage includes resistors R21 and R22 that divide the output voltage and an amplifier IC21, and amplifies a difference voltage between a divided voltage and a reference voltage Vr of a voltage source Vs21 by the amplifier IC21 and outputs as a detecting voltage. Vr×(R21+R22)/R22 corresponds to the predetermined voltage to the output voltage, and is the same as the conventional switching power supply equipment shown in FIG. 8 (resistance values of resistors R21 and R22 are respectively assumed R21 and R22). The error amplification circuit 2 further includes a diode D21, and the diode D21 is connected between the amplifier IC 21 and the pulse-width control circuit 12.

In addition, a series circuit of a resistor R1 and a capacitor C2 is connected as a delay circuit to make operation of the overload protection circuit 13 delay to a connecting point (input terminal Tfb) of the error amplification circuit 2 and the pulse-width control circuit 12. In the case that, here, there is a source capability (which is able to supply a current of plus to outside) in an output of the amplifier IC 21, a timer by the series circuit of the resistor R1 and the capacitor C2 does not function as the timer due to the capacitor C2 being charged by the output of amplifier IC 21 instantly when the timer starts operation. Therefore the diode D21 is connected to the output side of the amplifier IC 21.

Figure 2A:
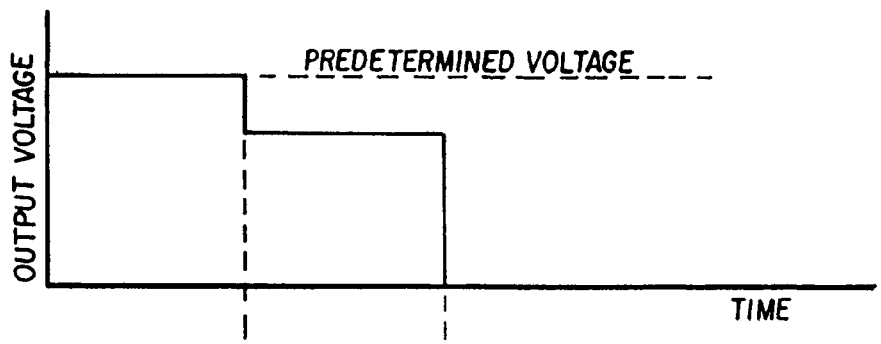
FIGS. 2(a) to 2(c) are operation waveforms showing respectively an output voltage, a feedback terminal voltage and a gate drive pulse of the switching power supply equipment according to the first embodiment.
Figure 2B:
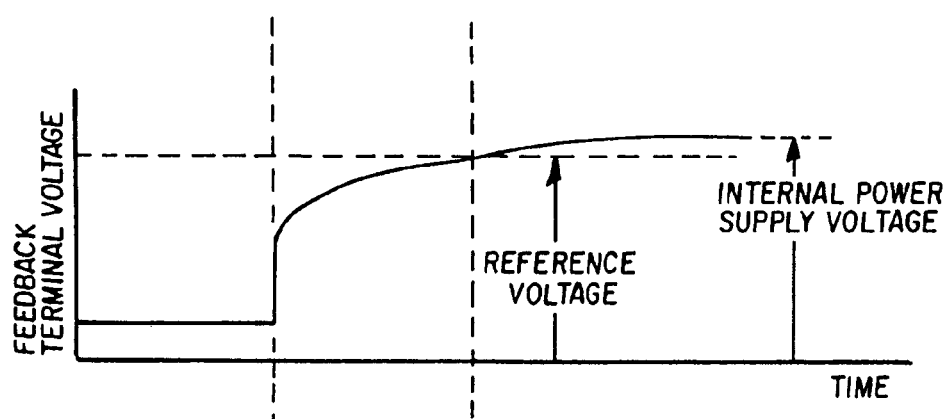
Figure 2C:
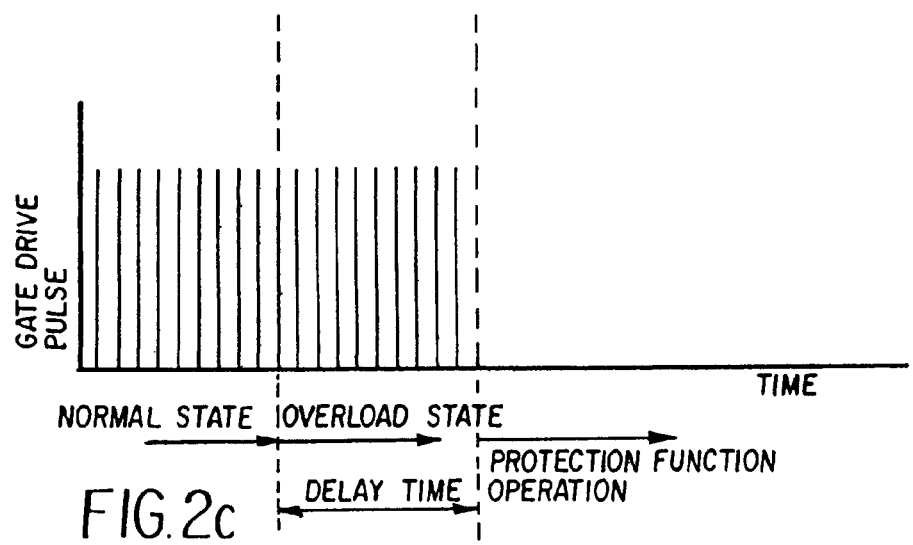

FIGS. 2(a) to 2(c) are operation waveforms showing respectively an output voltage, a feedback terminal voltage and a gate drive pulse of the switching power supply equipment according to the first embodiment. In a usual (operation) state, a voltage of the feedback terminal Tfb of the power supply control circuit 1 is adjusted by a function of the error amplification circuit 2 so that the output voltage becomes the predetermined voltage. Since an output of amplifier IC 21 becomes over a maximum range when the output voltage decreases due to being caused an over load for a switching power supply output, the capacitor C2 integrates a current supplied through a charging resistor R11 in the power supply control circuit 1 and then a voltage of the feedback terminal Tfb rises. And the output of the comparator IC 11 is inverted and the overload protection circuit 13 starts operation when the voltage of the feedback terminal Tfb reaches the reference voltage Vref of the comparator IC 11.

In other words the delay time which it is necessary to charge the capacitor C2 is produced till the overload protection circuit 13 starts operation after the over load state is caused. For this reason, when a over current flows transiently in starting or the over current flows transiently in the load sudden change, malfunctions of the overload protection circuit 13 can be avoided without the overload protection circuit 13 malfunctioning in the case that an operation of the switching power supply is normal. In other words even if the output of the amplifier IC 21 becomes over a maximum range instantly and an integral of the capacitor C2 starts, in the case that the output voltage returns to be normal, the output of the amplifier IC 21 falls down and a charge of capacitor C2 is discharged through the diode D21 (the diode D21 is connected to a forward direction for discharge), so that the voltage of the feedback terminal Tfb can be returned to a normal value.

According to the first embodiment, in the power supply control circuit 1 having the overload protection circuit 13 with the delay time, other terminal (an existing input terminal) can be commonly used as a terminal to connect the external capacitor C2 to determine the delay time, so that the number of the terminal of the integrated circuit and the number of components can be decreased, and miniaturization of a overall size can be realized.

In other words, because the delay circuit to make the operation of the overload protection circuit 13 delay is connected to the connecting point of the error amplification circuit 2 and the pulse-width control circuit 12 to set the operating delay time of the overload protection circuit 13, the number of the terminals of the integrated circuit is not increased, and also a package size of the integrated circuit is not increased.

In addition, the resistor R1 is connected in series with the capacitor C2. The reason is that it is possible to instantly respond when the load is caused the sudden change during the normal operation. By way of example only, when only the capacitor C2 is connected to the feedback terminal Tfb without providing the resistor R1, even if the voltage of the feedback terminal Tfb is tried to be changed instantly, a voltage change of the feedback terminal Tfb becomes too late since it is necessary for the capacitor C2 to have a charging time or a discharging time.

On the other hand, in the case that the resistor R1 is connected, when the load is caused the sudden change, a current flows to the resistor R1 from the error amplification circuit 2 or the charging resistor R11 in the power supply control circuit 1 (a current of the same value as the charging resistor R11 flows also to the resistor R1) and a voltage corresponding to the current through the resistors R11 and R1 is generated across the resistor R1. The voltage of the feedback terminal Tfb can be changed instantly by the generated voltage across the resistor R1. Since the scope which the voltage of the feedback terminal Tfb can be changed instantly in response to the change of the load is used as an effective scope in which can be used for controlling the output voltage, a delay for a transient response such as a load sudden change is not caused.

Figure 3:
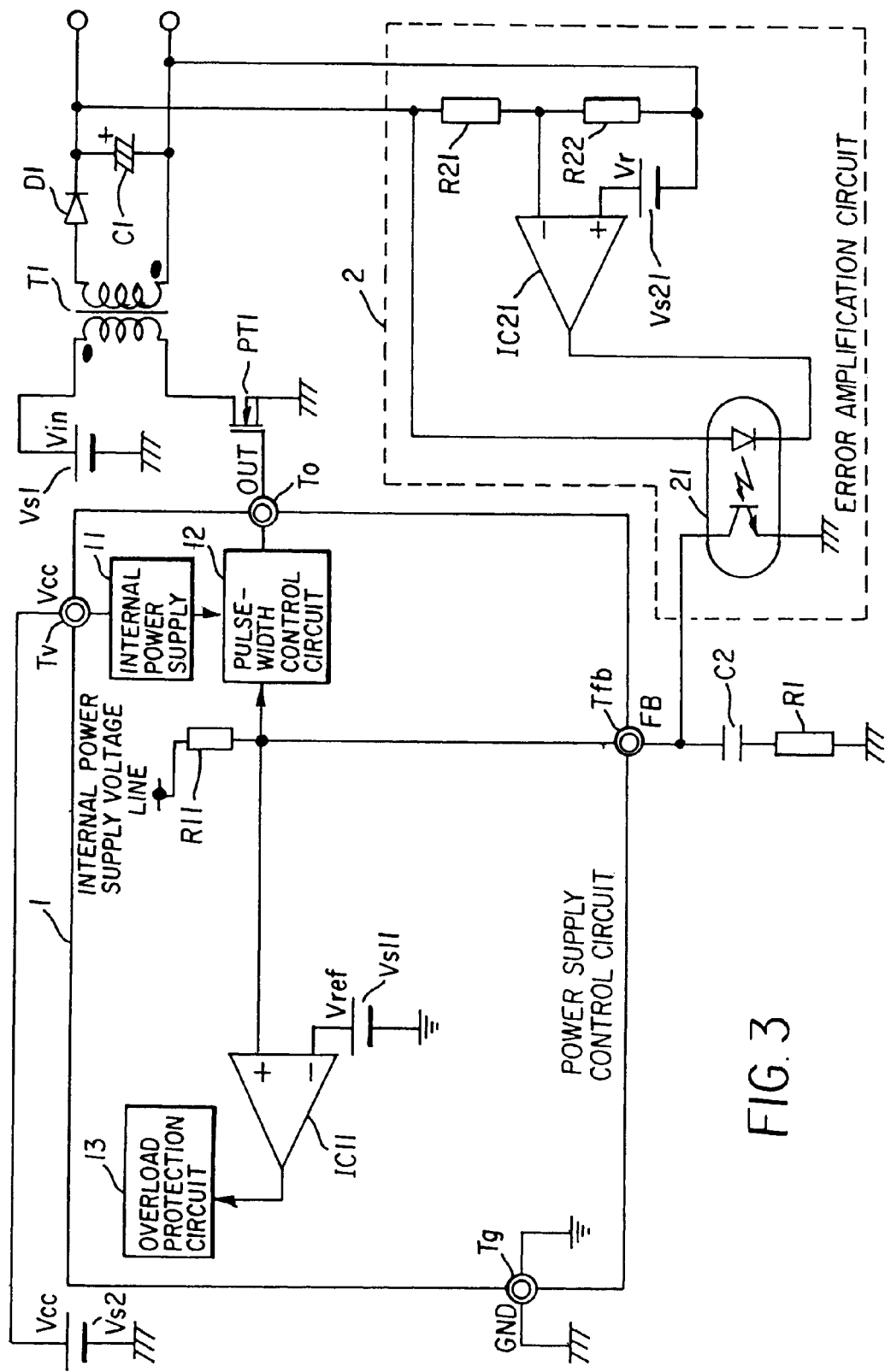
FIG. 3 is a schematic diagram showing a circuit configuration of a switching power supply equipment according to a second embodiment of the present invention.

FIG. 3 is a schematic diagram showing a circuit configuration of a switching power supply equipment according to a second embodiment of the present invention. The output of amplifier IC 21 is transmitted to the feedback terminal Tfb through a photocoupler 21 according to the second embodiment. A configuration according to the second embodiment is the same as FIG. 1 except use of the photocoupler 21.

The second embodiment is applied to the switching power supply equipment that an input and an output are insulated. Even if such a connecting method is applied, the output of the photocoupler 21 can be considered to be the output of the error amplification circuit 2 and the series circuit of the resistor R1 and the capacitor C2 can be connected to the input terminal Tfb.

Figure 4:
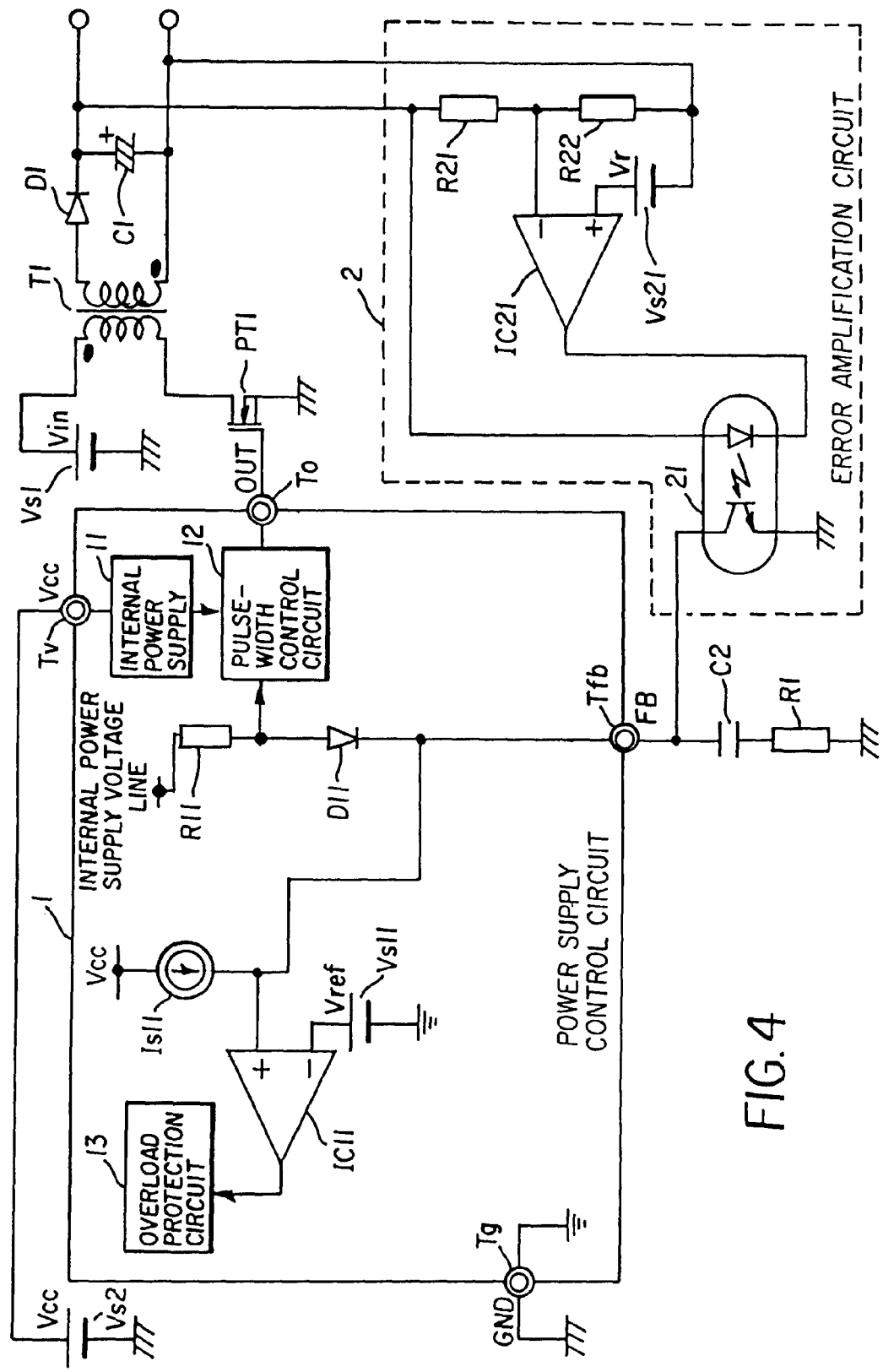
FIG. 4 is a schematic diagram showing a circuit configuration of a switching power supply equipment according to a third embodiment of the present invention.
Figure 5A:
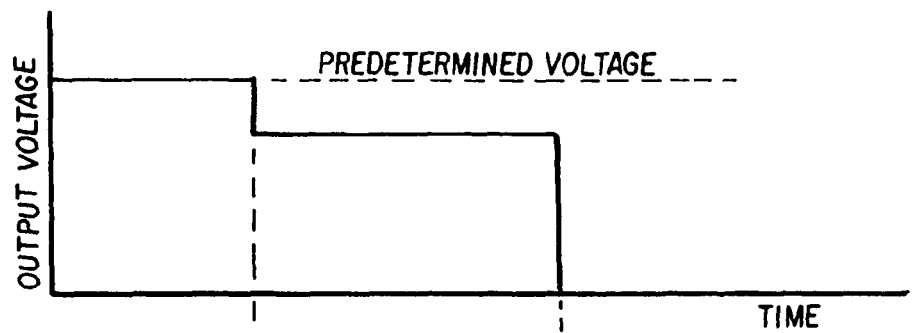
FIGS. 5(a) to 5(c) are operation waveforms showing respectively an output voltage, a feedback terminal voltage and a gate drive pulse of the switching power supply equipment according to the third embodiment.
Figure 5B:
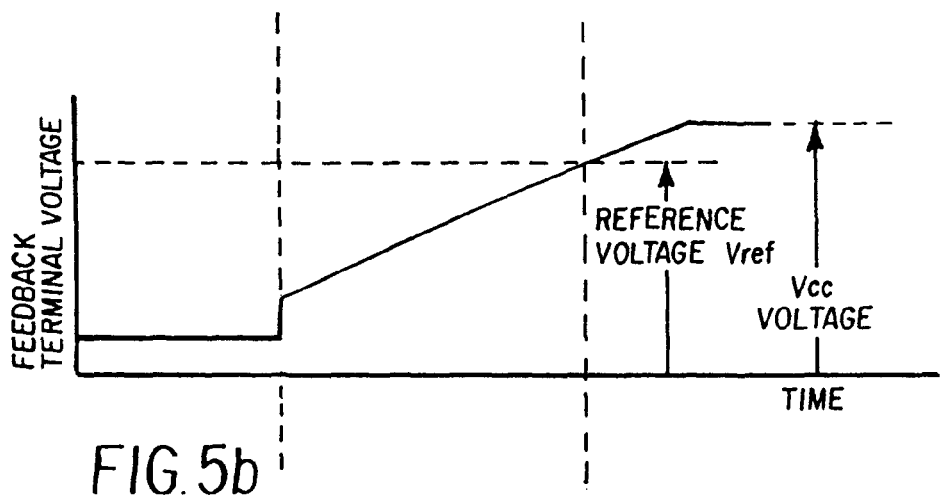
Figure 5C:
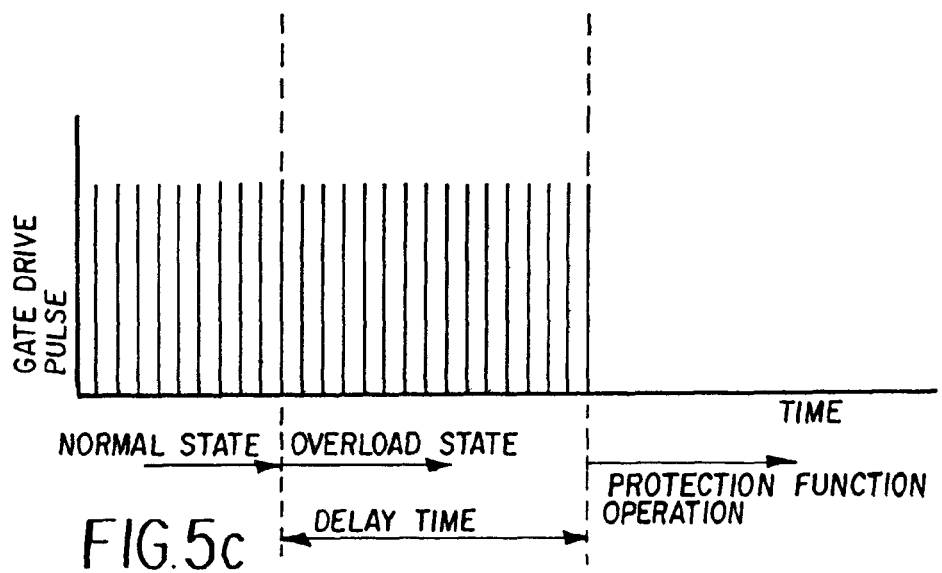

FIG. 4 is a schematic diagram showing a circuit configuration of a switching power supply equipment according to a third embodiment of the present invention. A diode D11 is connected between the feedback terminal (the input terminal) Tfb and an input port of the pulse-width control circuit 12, and a current source Is11 is connected to the input terminal Tfb in the power supply control circuit 1 according to the third embodiment. The configuration is the same as FIG. 3 except the diode D11 and the current source Is11. FIGS. 5(a) to 5(c) are operation waveforms showing respectively an output voltage, a feedback terminal voltage and a gate drive pulse of the switching power supply equipment according to the third embodiment.

In the third embodiment, the diode D11 is additionally connected between the feedback terminal Tfb and a connecting point of the input port of the pulse-width control circuit 12 and the charging resistor R11, and the current source Is11 is additionally connected to the feedback terminal Tfb. In addition, the current source Is11 can be exchanged with a resistor.

In the first embodiment and the second embodiment shown respectively in FIG. 1 and FIG. 3, a charging voltage of the capacitor C2 rises only as high as the internal power supply voltage when the delay time is generated. In the configuration of the third embodiment, the charging voltage of the capacitor C2 can be raised to as high as the source voltage Vcc. Therefore to obtain a desired delay time, a capacitor of a comparatively small capacitance can be used. In other words, the source voltage Vcc is used for a source voltage of comparator IC 11, and then the capacitor C2 of the small capacitance can be used because the reference voltage Vref of the voltage source Vs11 can be raised.

Figure 6:
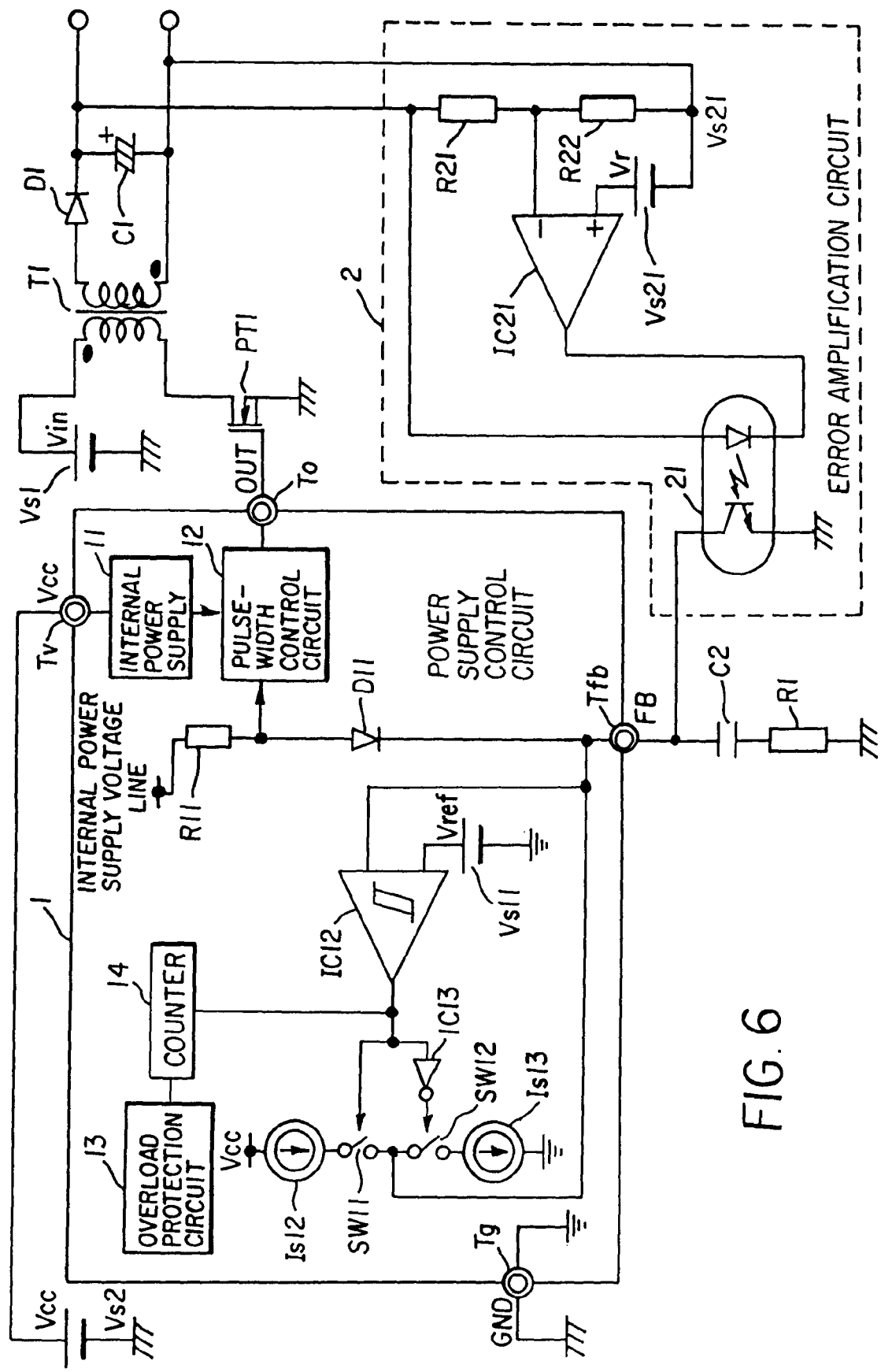
FIG. 6 is a schematic diagram showing a circuit configuration of a switching power supply equipment according to a fourth embodiment of the present invention.

FIG. 6 is a schematic diagram showing a circuit configuration of a switching power supply equipment according to a fourth embodiment of the present invention. In the fourth embodiment, a comparator IC 12 having a hysteresis characteristic is used to the comparator which compares the reference voltage Vref with a voltage of a connecting point of the error amplification circuit 2 and the pulse-width control circuit 12, and current sources Is12 and Is13 are respectively connected in series with electric switches SW11 and SW12 so that the capacitor C2 is repeatedly charged and discharged by an output of the comparator IC 12, and an inverter IC 13 is provided. In addition, a counter 14 counting the number of times that the output of the comparator IC 12 is inverted is provided, and the overload protection circuit 13 starts operation when the counter 14 counts the predetermined number of times. The configuration is the same as FIG. 4 except the above description.

The comparator IC12 having the hysteresis characteristics, the current sources Is12 and Is13 to repeatedly charge and discharge the external capacitor C2 being connected to the feedback terminal Tfb, and the counter 14 are provided in the power supply control circuit 1 according to the fourth embodiment. In addition, the current sources Is12 and Is13 can be exchanged with resistors. In addition, the internal power supply voltage can be connected to the current source Is12 which can be exchanged with the source voltage Vcc (when the current source Is12 is exchanged with a resistor, the internal power supply voltage can be connected to the resistor being exchanged with the source voltage Vcc).

In the switching power supply equipment configured as above, when the over load state is caused, the external capacitor C2 connected to the feedback terminal Tfb is repeatedly charged and discharged respectively through the current sources Is12 and Is13 due to the electric switches SW11 and SW12 complementarily switching ON and OFF (when one is in ON, the other is in OFF) by the output of the comparator IC 12. An oscillation is performed between two threshold values of the comparator IC 12 having the hysteresis characteristics. The counter 14 counts the number of times of the discharge and charge and the overload protection circuit 13 starts operation after counting the predetermined number of times of the discharge and charge.

Thus the delay time can be determined by repetition of the discharge and charge of the capacitor C2 by providing the counter 14, and then the capacitance of the capacitor C2 can be made smaller.

Figure 7A:
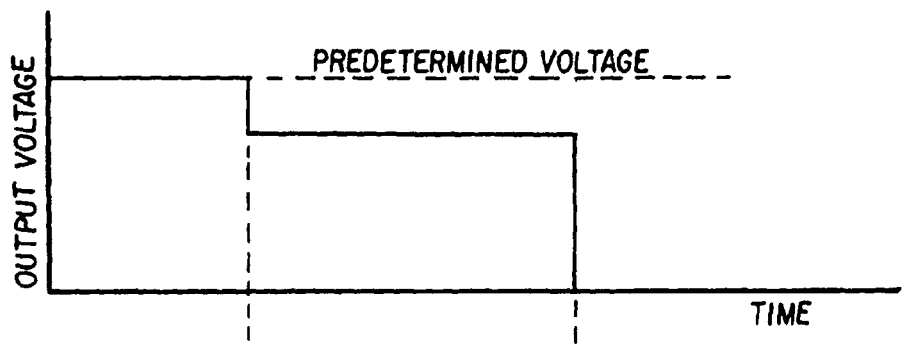
FIGS. 7(a) to 7(c) are operation waveforms showing respectively an output voltage, a feedback terminal voltage and a gate drive pulse of the switching power supply equipment according to the fourth embodiment.
Figure 7B:
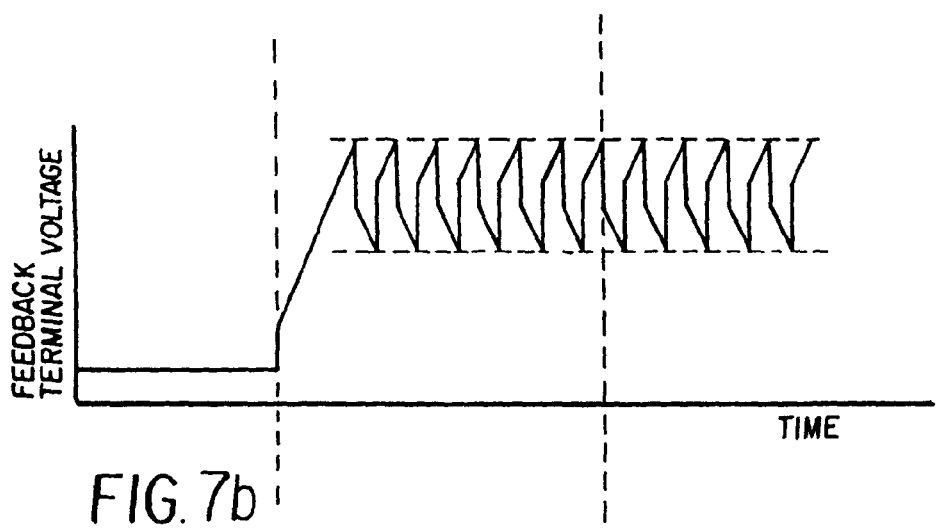
Figure 7C:
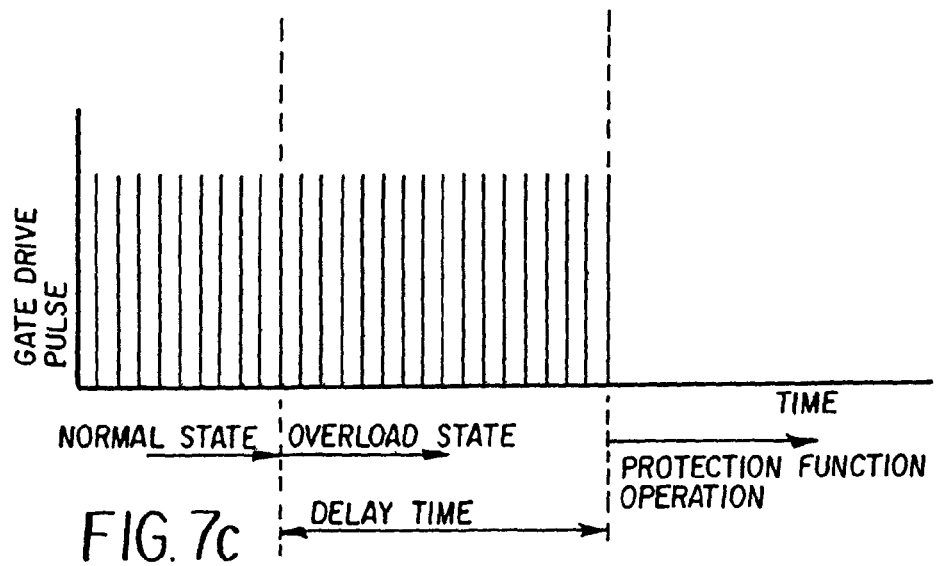

FIGS. 7(a) to 7(c) are operation waveforms showing respectively an output voltage, a feedback terminal voltage and a gate drive pulse of the switching power supply equipment according to the fourth embodiment. Whenever the electric switches SW11 and SW12 are switched to ON and OFF, the voltage of the feedback terminal Tfb shifts instantly due to a voltage determined by a product of the resistance value of the resistor R1 and the constant current value supplied by the source Is12 or the current source Is13 (the voltage of the feedback terminal Tfb=the constant current value×the resistance value of resistor R1+the voltage across capacitor C2, and the voltage across the capacitor C2 does not change instantly). The voltage of the feedback terminal Tfb changes with a linear tilt afterwards since the capacitor C2 is charged or discharged by the constant current.

In addition, the switching power supply equipment of the DC-DC converter of the flyback type is explained as an example in the above respective embodiment. The present invention is not restricted to the example, and the present invention can also be applied to a normal DC-DC converter such as a voltage step down converter which uses an inductor rather than the transformer. In addition, it does not need to say that there is a DC-DC converter that rectification of the output is unnecessary in the DC-DC converter to use the inductor.

In addition, in the above respective embodiment, regarding connection of the series circuit of the resistor R1 and the capacitor C2 as the delay circuit, it is shown in the embodiments that one end of the capacitor C2 is connected to the input terminal Tfb and one end of the resistor R1 is connected to the ground (GND) potential. The resistor R1 and the capacitor C2 can be exchanged each other in the connection of the series circuit. In other words, the one end of the resistor R1 can be connected to the input terminal Tfb and the one end of the capacitor C2 can be connected to the ground (GND) potential. In this case, operation of the series circuit is the same as the above explanation.

What is claimed is:

1. A switching power supply equipment comprising:
    an error amplification circuit amplifying a difference voltage between an output voltage of the switching power supply equipment and a predetermined voltage, the error amplification circuit outputting an amplified output;
    a switching control circuit coupled to the error amplification circuit, wherein operation of a switching element coupled to the switching control circuit is controlled by the switching control circuit based on the output of the error amplification circuit;
    a comparator which compares a reference voltage with a voltage of a feedback terminal of the switching control circuit to which the output of the error amplification circuit is input;
    a protection circuit coupled to an output of the comparator, wherein the protection circuit functions at a time of abnormality of the output voltage of the switching power supply equipment based on the output of the comparator;
    a delay circuit for delaying operation of the protection circuit, wherein the delay circuit is connected to the feedback terminal and comprises a resistor and a capacitor in series, and wherein the feedback terminal is connected to a first voltage source through a first charging resistor; and
    a diode between the feedback terminal and the first charging resistor wherein a cathode of the diode is connected to the feedback terminal and the feedback terminal is connected to a second voltage source through a first charging current source or a second charging resistor.

2. The switching power supply equipment according to claim 1, wherein the switching control circuit is a pulse-width control circuit that controls a drive pulse width of the switching element.

3. The switching power supply equipment according to claim 1, wherein one end of the capacitor is connected to the feedback terminal and one end of the resistor is connected to a ground potential.

4. The switching power supply equipment according to claim 1, wherein one end of the resistor is connected to the feedback terminal and one end of the capacitor is connected to a ground potential.

5. A switching power supply equipment comprising:
    an error amplification circuit amplifying a difference voltage between an output voltage of the switching power supply equipment and a predetermined voltage, the error amplification circuit outputting an amplified output;
    a switching control circuit coupled to the error amplification circuit, wherein operation of a switching element coupled to the switching control circuit is controlled by the switching control circuit based on the output of the error amplification circuit;
    a comparator which compares a reference voltage with a voltage of a feedback terminal of the switching control circuit to which the output of the error amplification circuit is input, wherein the comparator has a hysteresis characteristic;
    a protection circuit coupled to an output of the comparator, wherein the protection circuit functions at a time of abnormality of the output voltage of the switching power supply equipment based on the output of the comparator;
    a delay circuit for delaying operation of the protection circuit, wherein the delay circuit is connected to the feedback terminal and comprises a resistor and a capacitor in series, and wherein the feedback terminal is connected to a first voltage source through a first charging resistor;

a second charging current source and a first switching means which are provided in series between the feedback terminal and a voltage source;

a discharging current source and a second switching means which are provided in series between the feedback terminal and the ground potential;

a diode provided between the feedback terminal and the first charging resistor, wherein a cathode of the diode is connected to the feedback terminal; and a counter that counts the number of times that an output of the comparator is inverted, wherein the capacitor is repeatedly charged and discharged due to the first switching means and the second switching means complementarily switching ON and OFF by the output of the comparator, and wherein the protection circuit starts operation when counter counts to a predetermined number.

6. A switching power supply equipment comprising:

an error amplification circuit amplifying a difference voltage between an output voltage of the switching power supply equipment and a predetermined voltage, the error amplification circuit outputting an amplified output;

a switching control circuit coupled to the error amplification circuit, wherein operation of a switching element coupled to the switching control circuit is controlled by the switching control circuit based on the output of the error amplification circuit;

a comparator which compares a reference voltage with a voltage of a feedback terminal of the switching control circuit to which the output of the error amplification circuit is input, wherein the comparator has a hysteresis characteristic;

a protection circuit coupled to an output of the comparator, wherein the protection circuit functions at a time of abnormality of the output voltage of the switching power supply equipment based on the output of the comparator;

a delay circuit for delaying operation of the protection circuit, wherein the delay circuit is connected to the feedback terminal and comprises a resistor and a capacitor in series, and wherein the feedback terminal is connected to a first voltage source through a first charging resistor;

a third charging resistor and a first switching means which are provided in series between the feedback terminal and a voltage source;

a discharging resistor and a second switching means which are provided in series between the feedback terminal and the ground potential;

a diode provided between the feedback terminal and the first charging resistor, wherein a cathode of the diode is connected to the feedback terminal; and a counter that counts the number of times that an output of the comparator is inverted;

wherein the capacitor is repeatedly charged and discharged due to the first switching means and the second switching means complementarily switching ON and OFF by the output of the comparator, wherein the protection circuit starts operation when counter counts to a predetermined number.

* * * * *